United States Patent [19]

Ta

[11] Patent Number: 4,776,179

[45] Date of Patent: Oct. 11, 1988

[54] RADIO-LINKED AUTOMATIC CLIMATE CONTROL SYSTEM FOR MOTOR VEHICLE AIR-CONDITIONING

[76] Inventor: S. Henry Ta, 6240 E. Tamarind St., Agoura, Calif. 91301

[21] Appl. No.: 87,318

[22] Filed: Aug. 20, 1987

[51] Int. Cl.⁴ ............................................ F25B 49/00
[52] U.S. Cl. ................................ 62/176.6; 236/44 C; 236/51
[58] Field of Search ............... 62/323.4, 243, 229, 62/176.6; 236/51, 44 C; 374/183

[56] References Cited

U.S. PATENT DOCUMENTS

| | | | |
|---|---|---|---|
| 3,724,230 | 4/1973 | Muto et al. | 62/133 |
| 4,337,818 | 6/1982 | Franz | 165/2 |
| 4,350,023 | 9/1982 | Kuwabara et al. | 236/44 C |
| 4,356,705 | 11/1982 | Konan et al. | 62/229 |
| 4,416,324 | 11/1983 | Sutoh et al. | 165/12 |
| 4,433,719 | 2/1984 | Cherry et al. | 236/51 X |
| 4,476,919 | 10/1984 | Akimoto et al. | 165/28 |
| 4,540,040 | 9/1985 | Fukumoto et al. | 165/12 |
| 4,570,450 | 2/1986 | Takemi et al. | 62/199 |

FOREIGN PATENT DOCUMENTS 0109737  6/1984  Japan .................... 236/51

*Primary Examiner*—William E. Wayner

[57] ABSTRACT

An electronic system to keep the set air temperature inside a motor vehicle constant. It comprises an electronic thermostat, a radio transmitter to transmit the on/off signals of said thermostat, a radio receiver to capture said on/off signals which will drive a switching circuit 10 to turn on/off the vehicle air-conditioner, and a time delay network 9 to delay the on/off actions of said switching circuit. Said electronic thermostat comprises a temperature sensing circuit 1, a temperature setting circuit 2, a humidity sensing circuit 3 to compensate the set temperature, a comparator 4 to compare the two output voltages from said temperature sensing circuit and said temperature setting circuit, and a switching circuit 5 to turn on/off the transmitter. The thermostat and the transmitter are packed together and installed on the motor vehicle dashboard. The receiver and the time delayed switching circuit are packed together and installed under the hood of said motor vehicle. The system requires no skill and no tools for installation, can extend the air-conditioner life and save the fuel consumption up to 90% over the other existing automatic or manual temperature control systems for motor vehicle air-conditioning.

11 Claims, 1 Drawing Sheet

RADIO-LINKED AUTOMATIC CLIMATE CONTROL SYSTEM FOR MOTOR VEHICLE AIR-CONDITIONING

BACKGROUND FIELD OF INVENTION

This invention relates to electronic automatic climate control systems and electronic automatic temperature control systems for motor vehicle air-conditioning.

BACKGROUND DESCRIPTION OF PRIOR ART

Automatic climate or automatic temperature control of the conditioned air inside a motor vehicle is not new, yet it has been applied in most of the luxurious cars and recently becomes an option as an electronic package for some of the medium-priced cars, but drivers will have to pay at a high price to have this option installed at the factory. Therefore, most drivers will find it more desirable to see a much less expensive system that they can afford to pay for, while still enjoying the comfort of a tempered climate inside their cars.

OBJECTS AND ADVANTAGES

Accordingly, I claim the following as my objects and advantages of the invention: to provide a maximum comfort to the automobile passengers by automatically and continuously controlling the temperature and humidity of the air inside a motor vehicle, to provide a so inexpensive but not less efficient control system that all classes of people can buy to enjoy a comfortably conditioned air inside their motor vehicles, and to provide such a system which can save the vehicle fuel consumption by at least 50% over the existing climate control systems when the weather is not very hot. In addition, I claim the following as my further objects and advantages of the invention: to provide a climate control system which can be easily and quickly installed by any buyers mainly due to a radio transmission method for the system electrical linkage, and finally to provide such a system which can comparatively increase the life of the vehicle air-conditioner, because the refrigerant compressor does not operate at full time as with the other automatic or manual temperature control systems.

DRAWING FIGURES

DESCRIPTION

Figure 1:
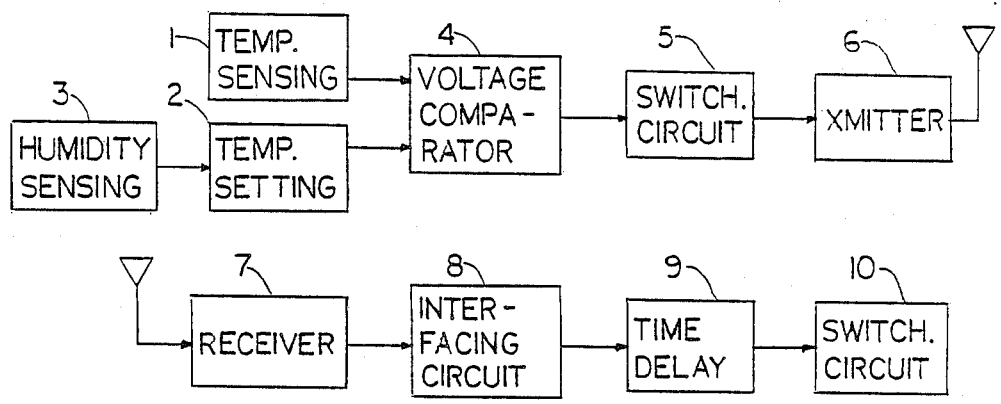
FIG. 1 shows a block diagram of the Radio-Linked Automatic Climate Control System according to the invention. It has two parts: a transmitting part, and a receiving part.

FIG. 1 shows a block diagram of the invented automatic climate control system. It comprises two parts: a transmitting part and a receiving part. The transmitting part comprises, in order of signal flow, a Temperature Sensing Circuit 1, a Temperature Setting Circuit 2, an Humidity Sensing Circuit 3, a Voltage Comparator 4, a Switching Circuit 5, and a Radio Transmitter 6. The receiving part comprises a Radio Receiver 7, an Interface Circuit 8, a Time Delay Network 9, and a Switching Circuit 10.

Figure 2:
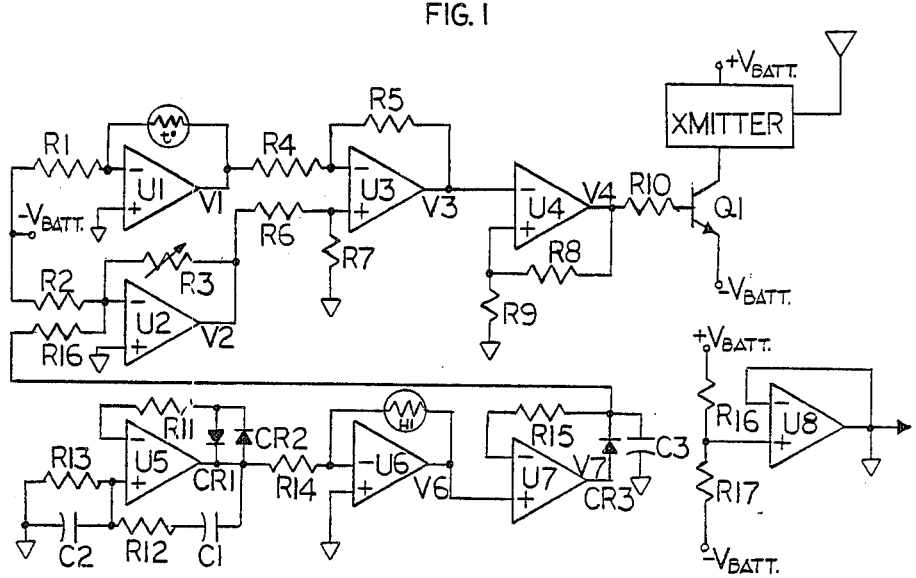
FIG. 2 shows a schematic diagram of the system transmitting part.

FIG. 2 shows the circuit schematic of said transmitting part in FIG. 1. The Temperature Sensing Circuit comprises resistor R1, thermistor t, and Integrated Operational Amplifier U1. The compensated Temperature Setting Circuit which is merely a summing amplifier comprises resistors R2, R16, potentiometer R3, and operational amplifier U2. The Humidity Sensing Circuit comprises a Wien-Bridge sine wave oscillator U5 with resistors R11, R12 and capacitors C1, C2; an amplifier U6 with resistor R14 and humidity sensing element H1; and a filtered rectifier U7 with resistor R15, diode CR3 and capacitor C3. The Voltage Comparator comprises resistors R4, R5, R6, R7 and operational amplifier U3. The Switching Circuit 5 comprises resistors R8, R9, R10, Op-amp U4, and transistor Q1. The Transmitter and the Receiver, considered here as integral components, are from the radio-controlled toy cars. $+V_{Batt}$ and $-V_{Batt}$ are the output terminals of a 9V alkaline battery, or of the motor vehicle battery outlet. The common ground of the circuits is derived from dividing the battery voltage to one half by divider R16, R17 and buffered by op-amp U8.

Figure 3:
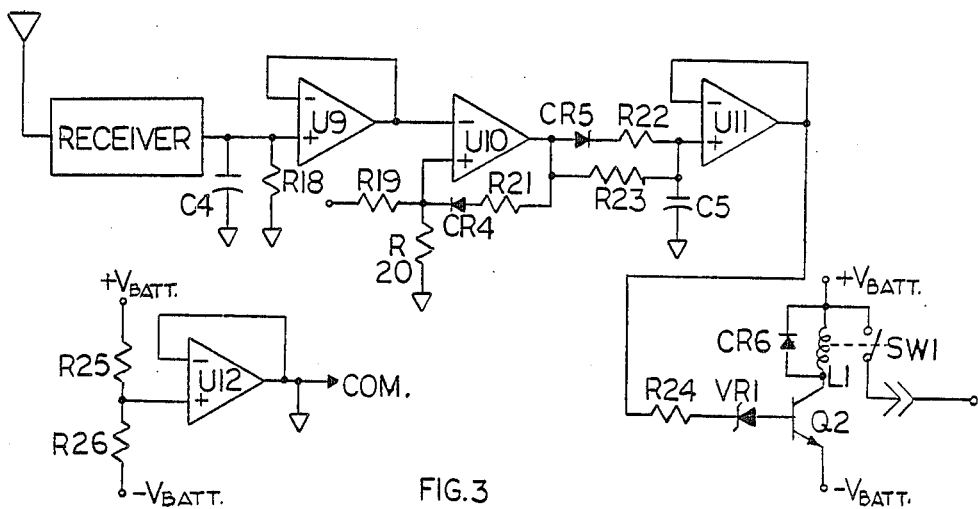
FIG. 3 shows a schematic diagram of the system receiving part.

FIG. 3 shows the circuit schematic of said receiving part in FIG. 1. The Interfacing Circuit comprises capacitor C4, resistor R18 and op-amp U9. The Time Delay Network comprises capacitor C5, resistors R22, R23 and diode CR5. The Switching Circuit 10 comprises op-amps U10, U11, resistors R19, R20, R21, R24, diode CR4, zener diode VR1, transistor Q2,, relay coil L1, and relay switch SW1. As with the transmitting part, the common ground of the receiving part circuits is derived from dividing the battery voltage to one half by dividing resistors R25, R26 and buffered by op-amp 12.

OPERATION

The basic principle of operation of the system is to sense the air temperature and humidity inside a motor vehicle, and to turn on or off a radio transmitter when the sensed temperature is above or below a preset temperature, a radio receiver under the hood of the motor vehicle demodulates the captured on/off signal which is amplified to drive a switching circuit to turn on or off the compressor of the air-conditioner.

Initially, the driver sets the thermostat to a desired temperature by varying potentiometer R3 in the temperature setting circuit, output voltage V2 from U2 is thus kept at a fixed level while output voltage V1 from U1 changes with the ambient air temperature because of the resistance-temperature characteristics of the thermistor t. Voltage comparator 4 compares these two output voltages. When the air temperature increases above a preset temperature, the thermistor resistance decreases and so is V1. V1 becomes lower than V2. Output voltage V3, which is equal to V3−V1, then starts to swing up positively above ground level. When V3 passes a certain threshold level which is fixed by the resistive divider R8 and R9, U4 output immediately switches down to nearly $-V_{BATT}$, thus makes Q1 non-conducting. With Q1 at the OFF state, the power supplying to the transmitter is cut off and the transmitter stops transmitting. Interfacing circuit 7 is used to couple the receiver to the switching circuit 10, C4 and R18 in the interfacing circuitare used to filter out undesirable noise that come out from the receiver. When the transmitter stops transmitting, output signal from the receiver is 0 volt, and since U9 is used as a voltage follower, its output voltage is also 0 volt that makes U10 switch to a maximum positive output due to the Schmitt trigger action from the feedback loop R19-21 and CR4. With U6 output going positive, diode CR5 conducts and makes U11 output also swing to a nearly maximum positive output voltage V11. V11 is so calculated that it barely exceeds the total voltage drop across R24, zener VR1 and base-emitter of transistor Q2 in order to increase the switching speed. As such, Q2 is quickly turned on, relay coil L1 is then energized, contact SW1 is switched to close to turn on the air-conditioner. With the air-conditioner running, the air inside the vehicle becomes cooler and cooler until its temperature just passes below a preset temperature, then V1 becomes higher than V2 due to an increase in the thermistor resistance, V3 therefore gradually decreases from a positive level to a negative level until it passes a lower threshold limit of U4 circuit, where U4 quickly switches back up to a maximumpositive level, turns Q1 on and so is the transmitter. With the transmitter at ON, a positive voltage is sent out from the receiver, V9 will positively increases until it passes an upper threshold limit of U10 circuit, where U10 output quickly switches down to a maximum negative level, C5 then starts to discharge through R23 path until a point is reached where V11 is nearly equal to $-V_{BATT}$. Q2 then stops conducting and de-energizes coil L1. Contact SW1 is therefore switched back to OPEN to turn off the air-conditioner, and another cycle repeats.

The temperature setting is automatically corrected by the humidity degree of the air inside a vehicle to compensate for a moist feeling and to keep the inside air at its maximum comfort range. The higher the humidity, the lower the resistance of the humidity sensor H1, and the lower the positive output voltage V7 from the filtered rectifier circuit U7. V7 is applied to the summing point of U2. As V7 decreases, V2 is also decreases and the air-conditioner must run relatively longer to decrease the air humidity before V1 can become smaller than V2 to switch it off.

Both the transmitter and the receiver come from the radio-controlled toy cars and are considered as the integral components of the invented system.

Delay network CR5,R22,R23,C5 as described earlier is used to provide a waiting period between two consecutive "turn-on" of the air-conditioner, in order to avoid a possible degradation in the compressor performance.

Since the refrigerant compressor is turned on and off during the air-conditioner operating period, the fuel consumption will be less than with the other existing control systems where the temperature is controlled by mixing the hot air to the cold air. The cooler the weather, the longer the OFF time of the compressor, and a fuel saving of up to 90% can be reached.

The temperature sensing sensitivity is controlled by the gain of the voltage comparator 4. The higher the gain, the lower the sensitivity, and the air inside the vehicle can be kept constant within ±0.01° C.

I claim:

1. An automatic climate control system for motor vehicles, comprising:
   a temperature sensing circuit for sensing the air temperature inside the passenger compartment of a motor vehicle and converting the change in resistance of a temperature-sensitive element into corresponding electrical signals, said circuit being a 1st inverting operational amplifier which has its input connected to a reference voltage and a temperaturesensitive element connected in the feedback loop;
   an humidity sensing circuitry for sensing the air humidity inside said passenger compartment and converting the change in resistance of an humidity-sensitive element to corresponding electrical signals, said circuitry including:
   (1) a sine wave oscillator;
   (2) a 2nd inverting operational amplifier having its input connected to the output terminal of said oscillator and its feedback loop connected to an humidity-sensitive element such that the amplitude of the sine wave from said oscillator is linearly proportional to the humidity degree;
   (3) a 1st AC-to-DC converter for converting said sine wave signals to DC signals;
   an humidity-compensated temperature setting circuit for presetting the air temperature inside said passenger compartment to a desired value, said temperature setting circuit being an inverting summing operational amplifier which has a 1st input connected to said reference voltage, a 2nd input connected to the output terminal of said humidity sensing circuit, and a variable resistor connected in the feedback loop;
   a differential operational amplifier for comparing the sensed temperature to a preset temperature and amplifying the difference therebetween, said differential operational amplifier having a 1st input connected to the output terminal of said temperature sensing circuit and a 2nd input connected to the output terminal of said temperature setting circuit;
   a 1st switching circuit connected to the output terminal of said differential operational amplifier for instantly producing an oscillation-free actuating signal responsive to a predetermined difference between the sensed temperature and a preset temperature;
   a radio transmitter actuated by said actuating signal, thereby producing a modulated r-f carrier signal whenever the sensed temperature falls below a preset temperature by a predetermined difference;
   said temperature sensing circuit, said humidity sensing circuit, said temperature setting circuit, said differential operational amplifier, said 1st switching circuit and said radio transmitter are placed inside the passenger compartment of a motor vehicle and powered by the vehicle battery or by an external battery;
   a radio receiver for capturing, amplifying and demodulaitng said r-f carrier signal;
   a 2nd AC-to-DC converter for converting the modulating signal of said r-f carrier to a proportional DC signal;
   a 2nd switching circuit for producing a 2nd oscillation-free actuating signal responsive to said DC signal being at a greater value than a predetermined value;
   a driver circuit actuated by said 2nd actuating signal for energizing a compressor clutch of the vehicle air-conditioning system;
   a delay network being connected between said 2nd switching circuit and said driver for delaying the switching action and the turning on/off of said compressor;
   said radio receiver, said 2nd AC-to-DC converter, said 2nd switching circuit, said driver circuit and said delay network are placed in said motor vehicle and outside the passenger compartment.

2. An automatic climate control system as in claim 1 wherein said 1st AC-to-DC converter and said 2nd AC-to-DC converter are half-wave operational rectifiers having their output terminal connected to a filtering capacitor.

3. A system as in claim 1 wherein said 1st switching circuit and said 2nd switching circuit are Schmitt Trigger circuits.

4. A system as in claim 1 wherein said delay network comprises a diode, a capacitor, a 1st resistor and a 2nd resistor; said 1st resistor being connected in series with the cathode of said diode, said 2nd resistor being connected between the anode of said diode and the other end of said 1st resistor, said capacitor being connected between ground and the junction point of said 1st resistor and said 2nd resistor.

5. A system as in claim 4 wherein the anode of said diode is connected to the output terminal of said 2nd switching circuit and the junction point of said 1st resistor and said 2nd resistor is connected to the input terminal of said driver such that the switch-on time is delayed by the time constant of said capacitor and said 1st resistor in parallel with said 2nd resistor, and the switch-off time is delayed by the time constant of said capacitor and said 2nd resistor.

6. An automatic climate control system for motor vehicles, comprising:
- a temperature sensing circuit for sensing the air temperature inside the passenger compartment of a motor vehicle and converting the change in resistance of a temperature-sensitive element to corresponding electrical signals, said circuit being a 1st inverting operational amplifier which has its input connected to a reference voltage source and a temperature-sensitive element connected in the feedback loop.
- an humidity sensing circuitry for sensing the air humidity inside said passenger compartment and converting the change in resistance of an humidity sensing element to corresponding electrical signals, said circuitry including:
  (1) a 1st sine wave oscillator;
  (2) a 2nd inverting operational amplifier having its input connected to the output terminal of said 1st sine wave oscillator and its feedback loop connected to an humidity-sensitive element such that the amplitude of the sine wave from said 1st oscillator is linearly proportional to the humidity degree;
  (3) a 1st AC-to-DC converter for converting said sine wave signals to DC signals;
- an humidity-compensated temperature setting circuit for presetting the air temperature inside said passenger compartment to a desired value, said temperature setting circuit being an inverting summing operational amplifier which has a 1st input connected to said reference voltage, a 2nd input connected to the output terminal of said humidity sensing circuit, and a variable resistor connected in the feedback loop;
- a differential operational amplifier for comparing the sensed temperature to a preset temperature and amplifying the difference therebetween, said differential operational amplifier having a 1st input connected to the output terminal of said temperature sensing circuit and a 2nd input connected to the output terminal of said temperature setting circuit;
- a 1st switching circuit connected to the output terminal of said differential operational amplifier for instantly producing an oscillation-free actuating signal responsive to a predetermined difference between the sensed temperature and a preset temperature;
- a 2nd oscillator actuated by said actuating signal, thereby producing a continuous wave signal responsive to a sensed temperature being at a lesser value than a preset temperature by a predetermined difference therebetween;
- means for connecting the output terminal and the ground return of said 2nd oscillator respectively to a positive electrical wire via a 1st DC blocking capacitor and a negative electrical wire of the motor vehicle;
- said temperature sensing circuit, said humidity sensing circuit, said temperature setting circuit, said differential operational amplifier, said 1st switching circuit and said 2nd oscillator are placed inside said passenger compartment and powered by the vehicle battery or by an external battery;
- a detector circuit placed outside said passenger compartment and connected to a positive electrical wire of the vehicle via a 2nd DC blocking capacitor for detecting and amplifying said continuous wave signal;
- a 2nd AC-to-DC converter for converting said amplified continuous wave signal to a proportional DC signal;
- a 2nd switching circuit for producing a 2nd oscillation-free actuating signal responsive to said DC signal being at a greater value than a predetermined value;
- a driver circuit actuated by said 2nd actuating signal for energizing a compressor clutch of the vehicle air-conditioning system;
- time delay means being connected between said 2nd switching circuit and said driver for delaying the switching action and the turning on/off of said compressor.

7. A system as in claim 6 wherein said 2nd oscillator is a sine wave oscillator.

8. A system as in claim 6 wherein said 2nd oscillator is a modulated sine wave oscillator.

9. A system as in claim 6 wherein said 1st AC-to-DC converter and said 2nd AC-to-DC converter are half-wave operational rectifiers having a diode connected in the feedback loop and a filtering capacitor connected at the output terminal.

10. A system as in claim 6 wherein said 1st switching circuit and said 2nd switching circuit are Schmitt Trigger circuits.

11. A system as in claim 6 wherein said said detector circuit comprises:
- a 2nd/DC blocking capacitor having a 1st end connected to a positive electrical wire of the motor vehicle;
- a filter circuit for filtering undesirable noise out of said continuous wave signal, said filter circuit having its itput terminal connected to a 2nd end of said 2nd DC blocking capacitor;
- a 3rd operational amplifier for amplifying said continuous wave signal, said 3rd operational amplifier being connected between the output terminal of said filter circuit and the input terminal of said 2nd AC-to-DC converter.

* * * * *